United States Patent
Yanagawa et al.

(10) Patent No.: US 6,795,150 B2
(45) Date of Patent: Sep. 21, 2004

(54) LIQUID CRYSTAL DISPLAY DEVICE WITH V-SHAPED ELECTRODES HAVING DIFFERENT WIDTHS BETWEEN ELECTRODES

(75) Inventors: Kazuhiko Yanagawa, Tokyo (JP); Masuyuki Oota, Tokyo (JP); Keiichiro Ashizawa, Tokyo (JP); Masayuki Hikiba, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/338,008

(22) Filed: Mar. 11, 2003

(65) Prior Publication Data

US 2003/0123012 A1 Jul. 3, 2003

Related U.S. Application Data

(63) Continuation of application No. 09/548,271, filed on Apr. 12, 2000, now Pat. No. 6,538,713.

(30) Foreign Application Priority Data

| Apr. 16, 1999 | (JP) | 11-108843 |
| Apr. 16, 1999 | (JP) | 11-108844 |
| Apr. 16, 1999 | (JP) | 11-108845 |

(51) Int. Cl.[7] .......................................... G02F 1/1343
(52) U.S. Cl. ........................................ 349/141; 349/146
(58) Field of Search .................................. 349/141, 146

(56) References Cited

U.S. PATENT DOCUMENTS

| 5,434,690 A | | 7/1995 | Hisatake et al. |
| 5,745,207 A | * | 4/1998 | Asada et al. ................. 349/141 |
| 5,897,188 A | | 4/1999 | Sasuga et al. |
| 6,266,116 B1 | | 7/2001 | Ohta et al. |
| 6,341,003 B1 | | 1/2002 | Ashizawa et al. |
| 6,583,839 B2 | * | 6/2003 | Suzuki et al. ................. 349/141 |
| 6,618,109 B2 | * | 9/2003 | Hidehira et al. ............. 349/141 |

FOREIGN PATENT DOCUMENTS

| JP | 7-191336 | | 12/1993 | |
| JP | 719133 | * | 7/1995 | ........... G02F/1/343 |

* cited by examiner

Primary Examiner—Huyen Ngo
(74) Attorney, Agent, or Firm—Reed Smith LLP; Stanley P. Fisher, Esq.; Juan Carlos A. Marquez, Esq.

(57) ABSTRACT

The liquid crystal display device which can prevent the lowering of the aperture rate irrespective of the misalignment of substrates is disclosed. The liquid crystal display device includes a black matrix and respective electrodes which are formed along respective opposing sides of an aperture portion of the black matrix, and respective electrodes are formed in patterns where irrespective of the misalignment of the black matrix in the widthwise direction of the electrodes, the light transmitting region within the aperture portion of the black matrix is made substantially constant.

4 Claims, 12 Drawing Sheets

LIQUID CRYSTAL DISPLAY DEVICE WITH V-SHAPED ELECTRODES HAVING DIFFERENT WIDTHS BETWEEN ELECTRODES

This application is a Continuation of nonprovisional application Ser. No. 09/548,271, filed Apr. 12, 2000 now U.S. Pat. No. 6,538,713.

BACKGROUND OF THE INVENTION

The present invention relates to a liquid crystal display device, and more, particularly to an IPS mode (In-plane Switching mode) liquid crystal display device.

In the IPS mode liquid crystal display device, a pair of transparent substrates are arranged such that they face each other in an opposed manner by way of a liquid crystal and a pair of electrodes are formed in a spaced-apart manner from each other on a liquid-crystal-side pixel region of one transparent substrate and an electric field is generated between these electrodes so as to control the light transmittance of the liquid crystal against the light which passes between these electrodes.

That is, the pixel electrode and the counter electrode are formed in the region surrounded by signal lines and the electric field which is parallel to the transparent substrates is formed in the region defined between these electrodes.

Here, these electrodes are arranged such that the counter electrodes are disposed at both sides of the pixel region, that is, adjacent to the signal lines (drain lines), a pixel electrode is disposed adjacent to one of the counter electrodes, a counter electrode is disposed adjacent to this pixel electrode, another pixel electrode is disposed adjacent to this counter electrode and the other one of counter electrodes is disposed adjacent to this pixel electrode.

Such constitution is formed so as to prevent the electric field from the drain lines from terminating at the pixel electrode and to allow the electric field to terminate at the neighboring counter electrode thus preventing the invasion of noise.

On the other hand, on the other transparent substrate which is disposed such that it faces one transparent substrate in the opposed manner, a black matrix is formed thereon and this black matrix is formed so that it can shield not only the drain lines but also regions defined between the drain lines and the counter electrodes which are adjacent to these drain lines.

As mentioned previously, the electric fields are generated between the drain lines and the counter electrodes which are adjacent to the drain lines and the black matrix is provided for preventing a viewer from seeing the change of the light transmittance of the liquid crystal caused by the electric fields.

From this, it is recognized that the respective counter electrodes which are disposed adjacent to the drain lines are arranged such that a pair of sides thereof which face the aperture of the black matrix have portions thereof exposed.

Further, recently, the liquid crystal display device which forms a region where a pair of above-mentioned electrodes are bent respectively so as to differ the direction of the electric field generated between these electrodes has been proposed (see Japanese Laid-Open Patent Publication 148826/1998).

Such a constitution is called a multi-domain system and is capable of resolving the inconvenience caused by the visual angle dependence of the liquid crystal display panel that when the visual point is inclined obliquely relative to the main visual angle direction of the liquid crystal display panel, the reverse phenomenon of the luminance is induced.

However, when a slight misalignment (particularly, a misalignment in a direction which intersects the drain lines) occurs with respect to respective transparent substrates which are arranged such that they face each other in an opposed manner by way of the liquid crystal, there arises a case that the positional relationship between the black matrix and the respective counter electrodes cannot be achieved.

In such a case, out of these electrodes, one counter electrode is extended from the black matrix in an exposing direction in an excessive manner, while the other electrode is retracted in a direction to be completely shielded by the black matrix.

That is, corresponding to the misalignment of respective transparent substrates, the region of light which passes through the aperture of the black matrix is narrowed and hence, the inconvenience that the substantial lowering of the aperture rate is brought about.

The present invention has been made in view of the above and it is an object of the present invention to provide a liquid crystal display device which can prevent the lowering of the aperture rate irrespective of the presence of such misalignment of the substrates.

Further, with respect to the above-mentioned liquid crystal display device of the multi-domain system, a phenomenon that when the white display is made by using a so-called "normally black" as the liquid crystal, the bent portions out of a pair of the electrodes become dark, or alternatively, when the device is darkened by using "normally white", the bent portions become bright.

The former phenomenon brings about the lowering of the transmittance of light and the latter phenomenon brings about the lowering of the contrast so that both of them are not preferable and hence, their review is requested.

The present invention has been made in view of the above and it is an object of the present invention to provide a liquid crystal display device which does not bring about the lowering of the transmittance of light or the lowering of contrast.

Further, with respect to the IPS mode liquid crystal display device, the orientation films which are respectively formed on the transparent substrates arranged such that they face in an opposed manner by way of the liquid crystal can make their rubbing directions (initial orientation directions of the liquid crystal) directed in the same direction and the respective directions of the electric fields are respectively set to proper directions based on the initial orientation directions of this liquid crystal.

As a specific example, the liquid crystal display device where the initial orientation directions of the liquid crystal are set in parallel with the drain lines which supply video signals to respective pixels so that the pixel electrodes of the pixel region and the counter electrodes arranged in parallel with the pixel electrodes are formed such that they extend in a direction of drain lines in a zigzag pattern is known.

SUMMARY OF THE INVENTION

Among the inventions disclosed in the present application, the typical invention is briefly summarized as follows.

That is, the typical invention is characterized by the liquid crystal display device which includes a black matrix and respective electrodes which are respectively formed along opposing sides of an aperture portion of this black matrix, wherein respective electrodes are formed into a pattern where the light transmission region within the aperture portion of the black matrix becomes almost constant irrespective of the misalignment of the black matrix in a widthwise direction of the electrodes.

Further, among other inventions disclosed in the present application, the typical invention is briefly summarized as follows.

That is, the invention is characterized by the liquid crystal display device which includes an electric field generating region which generates an electric field parallel to a substrate and this electric field generating region has regions which respectively differ in the direction of electric field and the field intensity of a boundary portion between these respective regions is substantially made equal to the field intensity of respective regions.

In the liquid crystal display device having such a constitution, even when the electric field generating region extends while having the bent portions, the electric field of substantially equal intensity can be generated throughout the entire portions.

Accordingly, when the white display is performed by using a so-called "normally black" as the liquid crystal, it does induce the lowering of the transmittance of light or when it is darkened by using a so-called "normally white", it does not induce the lowering of the contrast.

Further, among other inventions disclosed in this application, the typical invention is briefly summarized as follows.

That is, the light transmittance of the liquid crystal is controlled by the electric field generated in parallel with the substrates and the electric field has two kinds of directions and the initial orientation direction of the liquid crystal has a given angle with respect to signal lines which supply signals to electrodes which generate the electric field.

The liquid crystal display device having such a constitution is of a multi-domain system where the initial orientation direction of the liquid crystal has a given angle with respect to signal lines.

Accordingly, even when the rubbing treatment along the initial orientation direction is applied to the orientation film, the roller travels in an oblique direction relative to the signal lines.

This prevents the roller from coming into contact with the signal lines (an insulation film may be interposed) at one time so that the breakdown of switching elements such as thin film transistors caused by the invasion of the static electricity which is generated by the roller can be prevented.

Further, at the time of performing the rubbing treatment by way of a mask, the roller travels while having an angle relative to sides of the aperture of the mask, that is, the roller travels from one corner portion to the other corner portion of the aperture which face each other in an opposed manner and hence, the peeling-off at the sides of the aperture of the mask can be restricted.

DETAILED DESCRIPTION OF THE PREFERRED EMBODIMENTS

The embodiments of the liquid crystal display device according to the present invention are explained in conjunction with attached drawings.

Embodiment 1

Figure 1:
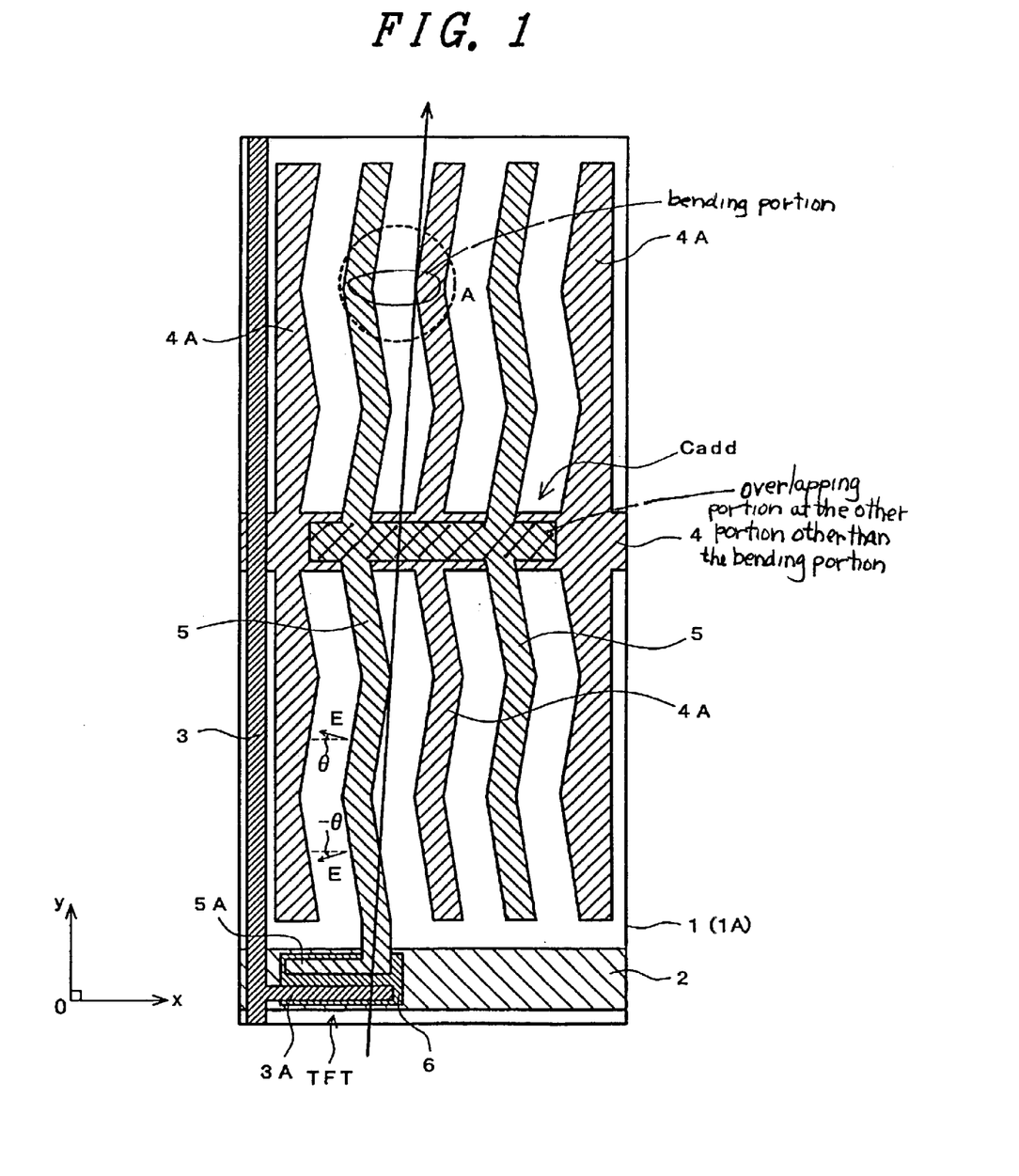
FIG. 1 is a plan view showing one embodiment of a pixel of a liquid crystal display device according to the present invention.

FIG. 1 is a plan view of one pixel out of respective pixels of a so-called IPS-mode liquid crystal display device.

Respective pixels are arranged in a matrix and constitute a display portions. Accordingly, the constitution of the pixel shown in FIG. 1 is as same as the constitutions of neighboring pixels disposed at left and right sides as well as up and down sides thereof.

Firstly, with respect to transparent substrates which are disposed in such a manner that they face each other in an opposed manner by way of a liquid crystal, a scanning signal line (gate line) 2 which extends in the x direction in the drawing is formed as a chromium layer, for example, on a liquid-crystal-side surface of the transparent substrate 1. As shown in the drawing, this gate line 2 is formed on the lower side of the pixel region, for example so as to substantially assure the maximum region which functions as the pixel.

To this gate line 2, gate signals are supplied from the outside of the display portion so as to drive a thin film transistor TFT which will be explained later.

On an approximately central portion of the pixel region, a counter voltage signal line 4 which extends in the x direction in the drawing and is made of the same material as the gate line 2, for example, are formed.

A plurality of counter electrodes 4A are integrally formed with the counter voltage signal line 4. Within the pixel region, the counter electrodes 4A extend in the y direction in the drawing and are arranged in parallel in the x direction in three rows, for example. In this case, the counter voltage signal line 4 is positioned at the centers of the respective counter electrodes 4A.

To these counter electrodes 4A, signals which become the counter with respect to video signals supplied to pixel electrodes 5 described later are supplied by way of the counter voltage signal line 4 so as to generate an electric field of an intensity corresponding to the above-mentioned video signals between the counter electrode 4A and the pixel electrode 5.

This electric field has a component which is parallel to the surface of the transparent substrate 1 and the light transmittance of the liquid crystal is controlled by the electric field having such a component. This is why the liquid crystal display device which is explained in this embodiment is called a so-called IPS mode (In-Plane Switching Mode).

Counter signals are supplied to the counter voltage signal line 4 from the outside of the display portion.

On the surface of the transparent substrate 1 where the gate line 2 and the counter voltage signal line 4 are formed, an insulation film (not shown in drawings) which is made of a silicon nitride film, for example, and also covers the gate line 2 and the counter voltage signal line 4 is formed.

This insulation film has a function of a gate insulation film in the region where the thin film transistor TFT which will be described later is formed, a function of an interlayer insulation film against the gate line 2 and the counter voltage signal line 4 in the region where a video signal line (drain line) 3 which will be described later is formed, and a function of a dielectric film in the region where a capacitance element Cadd which will be explained later is formed.

With the use of such an insulation film, the thin film transistor TFT is formed in such a manner that it superposes the gate line 2 and a semiconductor layer 6 made of an amorphous silicon, for example, is formed on the superposed portion.

Thereafter, a drain electrode 3A and a source electrode 5A are formed on the upper surface of the semiconductor layer 6 thus constituting the thin film transistor TFT having a so-called inverse staggered structure which employs a portion of the gate line 2 as a gate electrode.

Here, as shown in the drawing, the drain electrode 3A and the source electrode 5A on the semiconductor layer 6 are, for example, formed simultaneously with the pixel electrode 5 at the time of forming the drain line 3.

That is, the drain line 3 which is made of a chromium layer, for example, is formed such that it extends in the y direction in the drawing and the, drain electrode 3A which is integrally formed with this drain line 3 is formed on the semiconductor layer 6.

Here, as shown in the drawing, the drain line 3 is formed at the left side of the pixel region, for example, so as to substantially assure the maximum region which functions as the pixel.

Further, the source electrode 5A is formed simultaneously with the drain line 3 and is also integrally formed with the pixel electrode 5 here.

The pixel electrode 5 extends in the y direction in the drawing in such a manner that it runs between the above-mentioned counter electrodes 4A. In the drawing, the pixel electrodes 5 are formed in the x direction in two rows. In other words, the counter electrodes 4A are disposed at both sides of the pixel electrode 5 at an approximately equal distance and electric fields are generated between the pixel electrode 5 and the counter electrodes 4A.

Here, as can be clearly understood from the drawing, the pixel electrode 5 is formed of a zigzag electrode which repeats V-shaped patterns along its longitudinal direction. Corresponding to such zigzag electrode, respective counter electrodes 4A which face the pixel electrode 5 in an opposed manner are formed of zigzag electrodes (central electrodes) which repeat V-shaped patterns in a parallelly spaced-apart manner relative to the pixel electrode 5 or are formed of electrodes (electrodes adjacent to the drain lines 3) which change the width thereof.

Due to such a constitution, there exist a region where the direction of an electric field E generated between the pixel electrode 5 and the counter electrode 4A becomes $(-)\theta$ relative to the x direction and a region where such a direction becomes $(+)\theta$ relative to the x direction.

The reason why the direction of the electric field E is made different within the region of one pixel (or in the relationship with other pixels without limiting within the region of one pixel) is to change the light transmittance of the liquid crystal by rotating liquid crystal molecules respectively in opposite directions relative to the initial orientation direction.

In this manner, the liquid crystal display device is constituted so as to resolve the inconvenience caused by the visual angle dependence of the liquid crystal display panel that when the visual point is inclined relative to the main visual angle direction of the liquid crystal display panel, the reverse phenomenon of the luminance is induced. Such a constitution is called a so-called "multi-domain system".

In this embodiment, the initial orientation direction of the liquid crystal molecules makes an angle $\theta_3$ (for example, approximately 15°) relative to the extending direction (y direction) of the drain line 3. That is, the rubbing direction in the orientation films which will be described later is formed such that it is registered with this initial orientation direction.

That is, the initial orientation direction of the liquid crystal molecules is set such that it is prevented from being registered with the extending direction of the drain line 3 (or the gate line 2).

This is because that, at the time of forming the orientation film which will be described later, if the rubbing direction is registered with the drain line 3, there is a possibility that due to the travelling of the roller performed in the rubbing treatment, the static electricity from the roller invades the respective gate lines 2 at one time and hence, the thin film transistor TFT formed on the gate line 2 suffers from the static damage and the above determination of the initial orientation direction is made sodas to preliminarily prevent such a static damage.

That is, as in the case of this embodiment, so long as the travelling of the roller in the rubbing treatment makes an angle relative to the gate line 2, the travelling of the roller on the specific gate line 2 is performed gradually from one end to the other end and hence, an advantage that even when the static electricity from the roller invades the gate line 2, it does not give rise to the static damage of the thin film transistor TFT is obtained.

Figure 4:
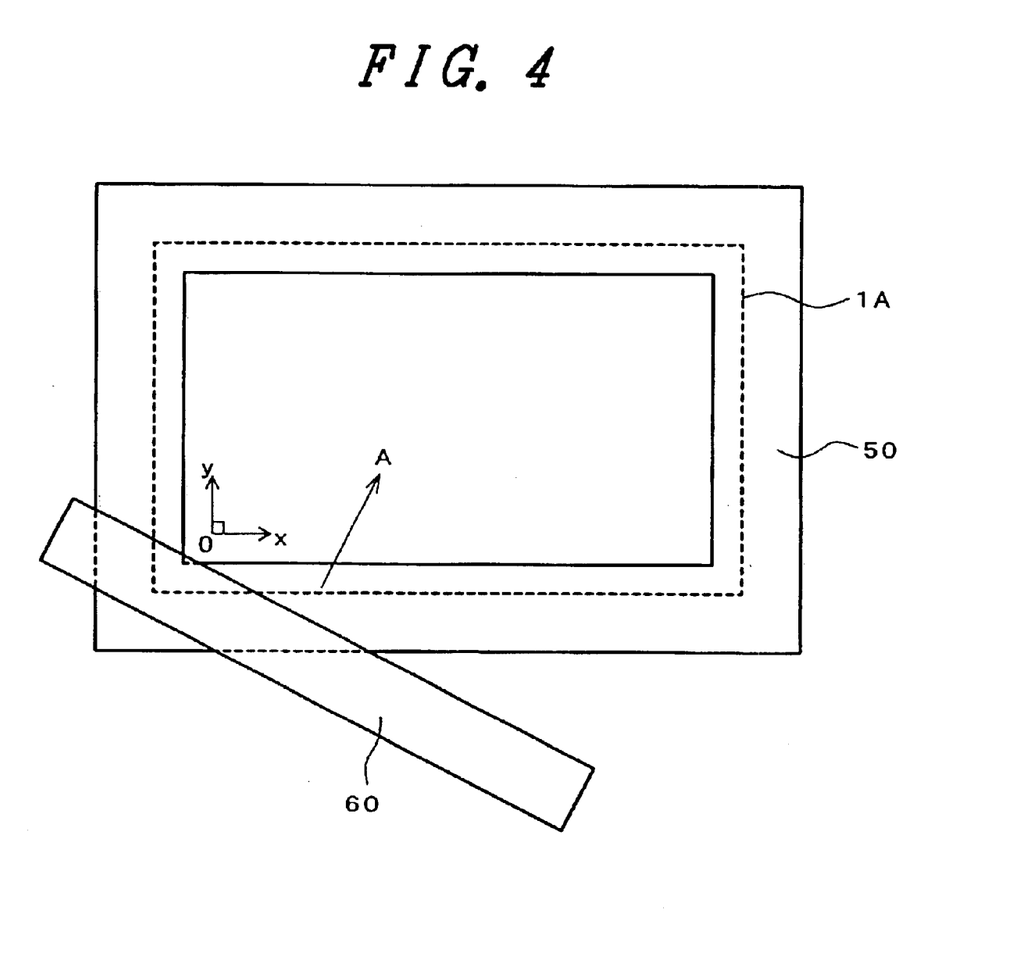
FIG. 4 is a view explaining an advantage of the liquid crystal display device of the present invention.

Further, another reason is that, as shown in FIG. 4, at the time of performing the rubbing treatment, in a condition that a mask 50 having an aperture is disposed on the display region which is an aggregate of pixels and the rubbing treatment along the initial orientation direction (arrow direction A in the drawing) of the liquid crystal is performed by way of this mask 50, even if the mask 50 is made of an extremely thin material (approximately 0.1 mm~0.3 mm), the peeling off of such a mask hardly occurs by the travelling (1000~1500 rpm) of a roller 60.

That is, in case the rubbing treatment is performed along the drain line 3, the roller must be traveled from one side to the opposing other side of the aperture of the mask and hence, the opposing side is liable to be peeled off, whereas, in case the rubbing treatment is performed with an angle relative to the drain line 3, the roller 60 travels from one corner to the opposing other corner of the aperture of the mask 50 and hence, the roller 60 is made to travel while pressing respective sides of the aperture.

The direction of the electric field within the pixel relative to the initial orientation direction of the liquid crystal is set to a proper value in view of the display characteristics.

Accordingly, in case the initial orientation direction of the liquid crystal is set to make the angle $\theta_3$ relative to the drain line 3 as mentioned previously, the above-mentioned directions $\theta$ and $(-)\theta$ of the electric fields are set to proper values correspondingly.

With respect to the pixel electrode 5, a portion thereof which superposes the counter voltage signal line 4 is formed such that its area is enlarged and a capacitance element Cadd is formed between the pixel electrode 5 and the counter voltage signal line 4. In this case, the dielectric film is made of the previously mentioned insulation film.

The capacitance element Cadd is formed, for example, for storing the video signals supplied to the pixel electrode 5 for a relatively long time. That is, the thin film transistor TFT is switched on with the supply of the scanning signals from the gate line 2 and the video signals from the drain line 3 are supplied to the pixel electrode 5 by way of this thin film transistor TFT. Thereafter, even if the thin film transistor TFT is switched off, the video signals supplied to the pixel electrode 5 are stored by the capacitance element Cadd.

Then, on the whole region of the surface of the transparent substrate 1 formed in the above-mentioned manner, a protective film (not shown in drawings) made of a silicon nitride film, for example, is formed so as to prevent the thin film transistor TFT from directly coming into contact with the liquid crystal.

Further, on the upper surface of this protective film, the orientation film (not shown in drawings) which determines the initial orientation direction of the liquid crystal is formed. This orientation film is formed by coating a synthetic resin film, for example, on the protective film and then providing the rubbing treatment to the surface of the resin film in the direction which makes the angle $\theta_3$ relative to the extending direction of the drain line 3 as mentioned previously.

The transparent substrate provided with such a surface treatment is called a so-called TFT substrate 1A. By interposing the liquid crystal on a surface of the transparent substrate on which the orientation film is formed and making the transparent substrate which is called a so-called filter substrate face the TFT substrate 1A in an opposed manner, the liquid crystal display panel is completed.

On the filter substrate, a black matrix which defines a profile of the pixel region on its liquid crystal side surface, a color filter formed to an aperture portion (corresponding to a central portion excluding the periphery of the pixel region) of this black matrix, an orientation film which is formed such that it comes into contact with the liquid crystal and the like are formed.

Here, the filter-substrate-side orientation film is formed, as in the case of the counterpart of the TFT substrate 1A, by coating a synthetic resin film on the color filter and then providing the rubbing treatment to its surface in the direction of the drain line 3 as mentioned previously.

In the so-called IPS mode liquid crystal display device, the orientation directions of the respective orientation films which are arranged by way of the liquid crystal are approximately in the same direction and the directions makes an angle $\theta_3$ relative to the extending direction of the drain line 3 in this embodiment.

As has been described heretofore, according to the liquid crystal display device of this embodiment, the static damage of the thin film transistor TFT can be prevented or the peeling off of the mask at the time of rubbing treatment of the orientation film can be prevented.

Embodiment 2

Figure 2:
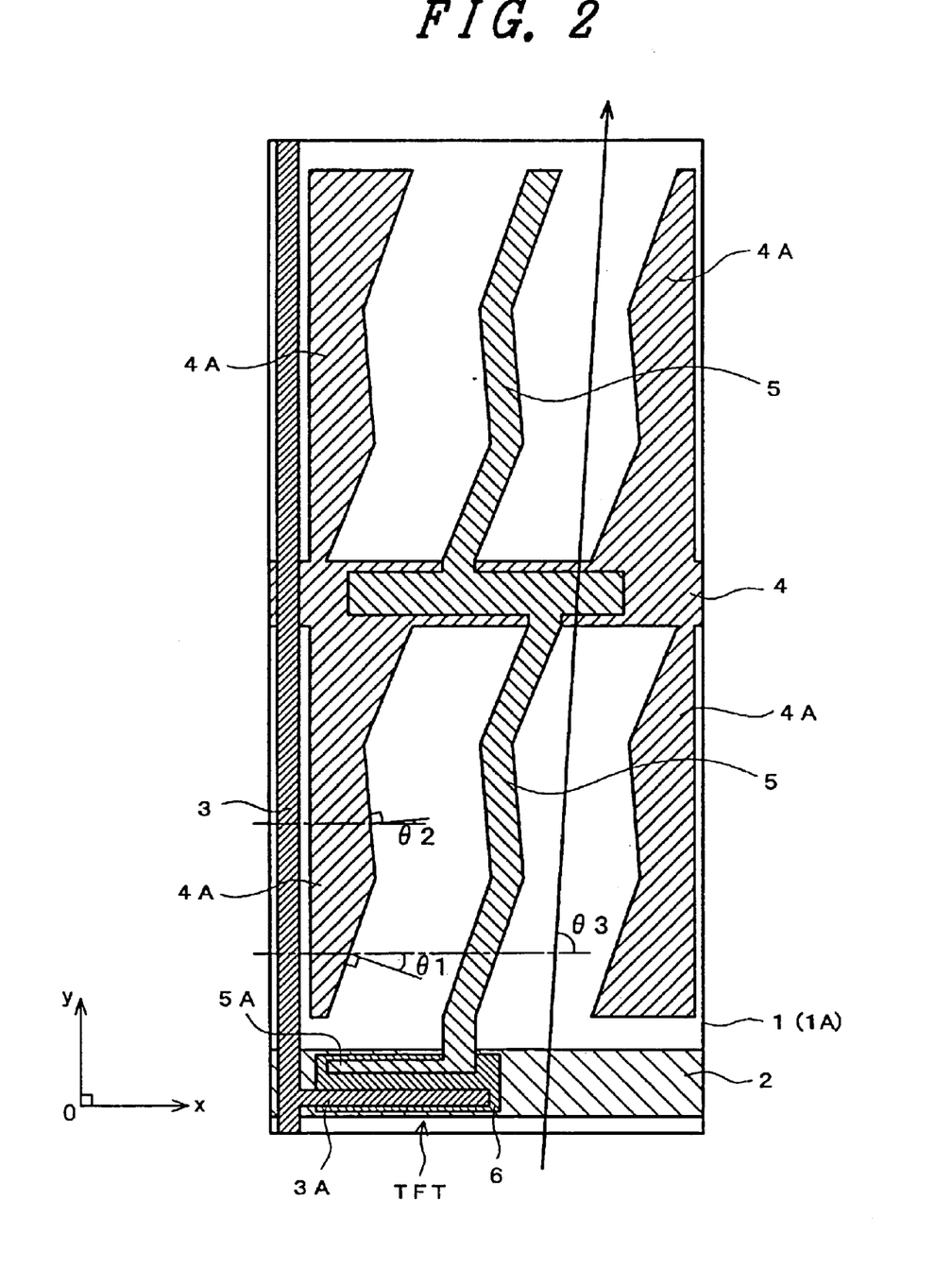
FIG. 2 is a plan view showing another embodiment of a pixel of a liquid crystal display device according to the present invention.

FIG. 2 is a plan view showing another embodiment of the liquid crystal display device of the present invention and it corresponds to FIG. 1.

The only constitution which differs from the constitution of FIG. 1 is that the patterns of the pixel electrode 5 and the counter electrodes 4A are different and other constitutions are the same as those of FIG. 1 including the angle $\theta_3$ of the initial orientation direction of the liquid crystal.

That is, the electric field generated between the pixel electrode 5 and the counter electrode 4A has two kinds of directions of electric field, wherein one direction makes an angle $\theta_1$ relative to the gate line 2 and the other direction makes an angle $\theta_2(\neq\theta_1)$ relative to the gate line 2.

Then, to obtain the proper display characteristics of the liquid crystal, the relationship between these directions $\theta_1$, $\theta_2(\neq\theta_1)$ of electric field and the direction $\theta_3$ of the initial orientation direction is set to meet a following formula (1).

$$\theta_3=(180°-\theta_1+\theta_2)/2 \qquad (1)$$

From this formula(1), the values of $\theta_1$, $\theta_2$ and $\theta_3$ can be set to 20°, 10°, 85° respectively, for example.

In this embodiment, the initial orientation direction of the liquid crystal is also set such that it is not registered with the extending direction of the drain line 3 as in the case of the first embodiment and hence, the static damage of the thin film transistor TFT can be obviated or any trouble on the rubbing treatment of the orientation films can be prevented.

The above-mentioned formula (1) expresses the relationship of the initial orientation direction $\theta_3$ of the liquid crystal, the directions $\theta_1$, $\theta_2$ of electric field relative to the direction (extending direction of the gate line 2) which intersects the drain line 3 at a right angle.

It is needless to say, however, that the initial orientation direction of the liquid crystal relative to the extending direction of the drain line 3 is set to $\theta_3'$ ($\neq0$) and the directions $\theta_1'$, $\theta_2'$ of electric field are set respectively relative to this initial orientation direction of the liquid crystal.

The relationship in such a case is expressed by a following formula (2).

$$\theta_1'+\theta_2'=180° \qquad (2)$$

Embodiment 3

Figure 3:
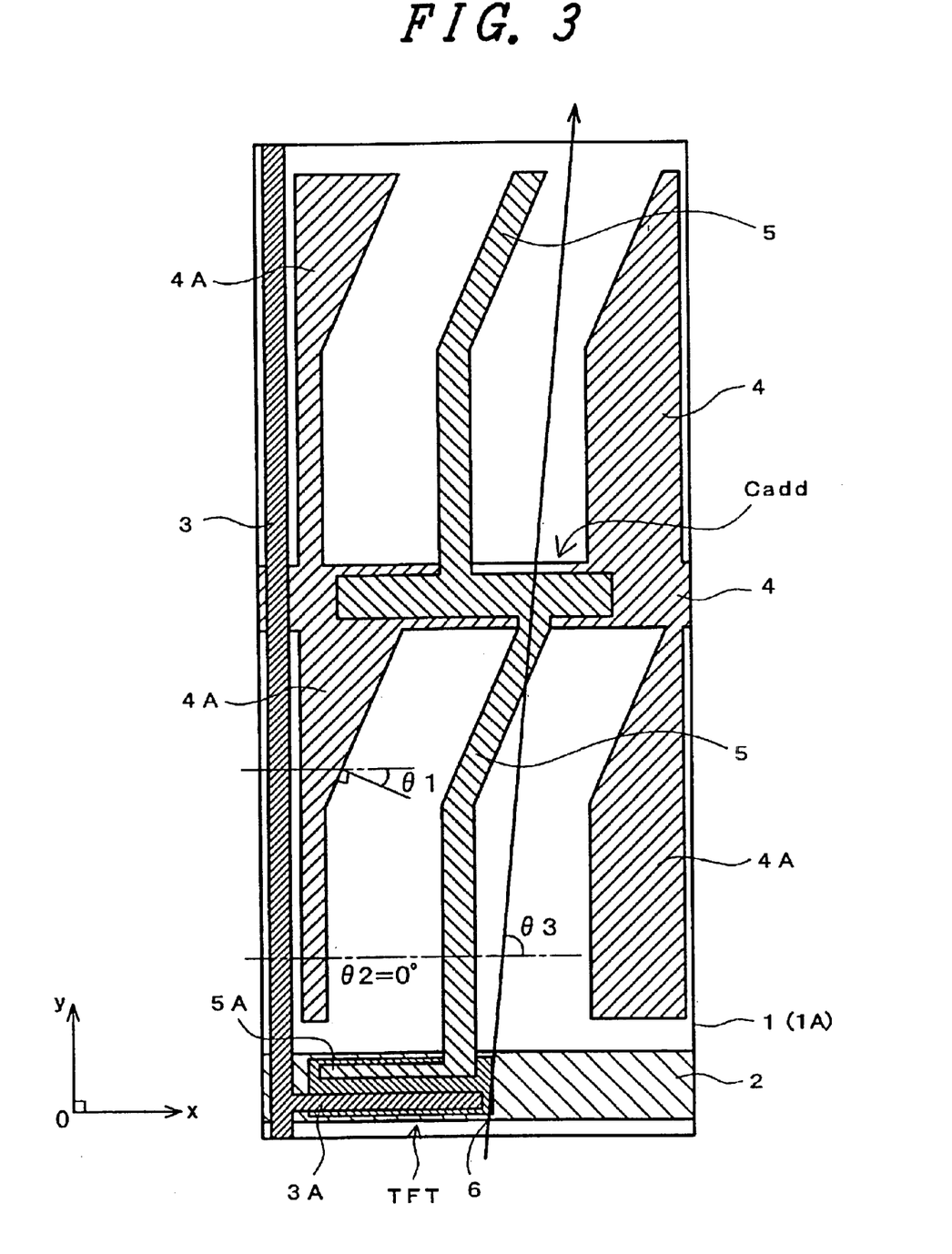
FIG. 3 is a plan view showing another embodiment of a pixel of a liquid crystal display device according to the present invention.

FIG. 3 is a plan view of another embodiment of the liquid crystal display device of the present invention and it corresponds to FIG. 2.

In FIG. 3, as in the case of FIG. 2, the relationship between two kinds of directions $\theta_1$, $\theta_2$ (t $\theta_1$) of electric field which is generated between the pixel electrode 5 and the counter electrode 4A and the angle $\theta_3$ of the initial orientation direction of the liquid crystal is set similarly to meet the above-mentioned formula (1). However, in particular, FIG. 3 is different from FIG. 2 in that $\theta_2$ is set as $\theta_2=0°$.

Accordingly, in case $\theta_1$ is set as $\theta_1=30°$, $\theta_3$ becomes $\theta_3=75°$, while in case $\theta_1$ is set as $\theta_1=10°$, $\theta_3$ becomes $\theta_3=85°$.

By setting $\theta_2$ as $\theta_2=0°$, both of the pixel electrode 5 and the counter electrode 4A have their sides which face the sides of other electrodes formed in parallel with the extending direction of the drain line 3.

This brings about an advantage that the pattern residue hardly occurs in forming the pixel electrode 5 or the counter electrode 4A by performing the selective etching of the photolithography technique thus enhancing the yield of products.

The above-mentioned embodiments 1 and 2 explain the case where the initial orientation direction of the liquid crystal is set to approximately 15° relative to the drain line 3. It is needless to say that the present invention is applicable to a case where the initial orientation direction of the liquid crystal is set to approximately 15° relative to the gate line 2.

In this case, it is needless to say that the patterns of the pixel electrode 5 and the counter electrode 4A are altered such that two kinds of angles (corresponding to $\Theta_1$, $\theta_2$ in FIG. 2) of electric field can be set to proper values corresponding to the initial orientation direction of the liquid crystal.

Embodiment 4

Figure 5:
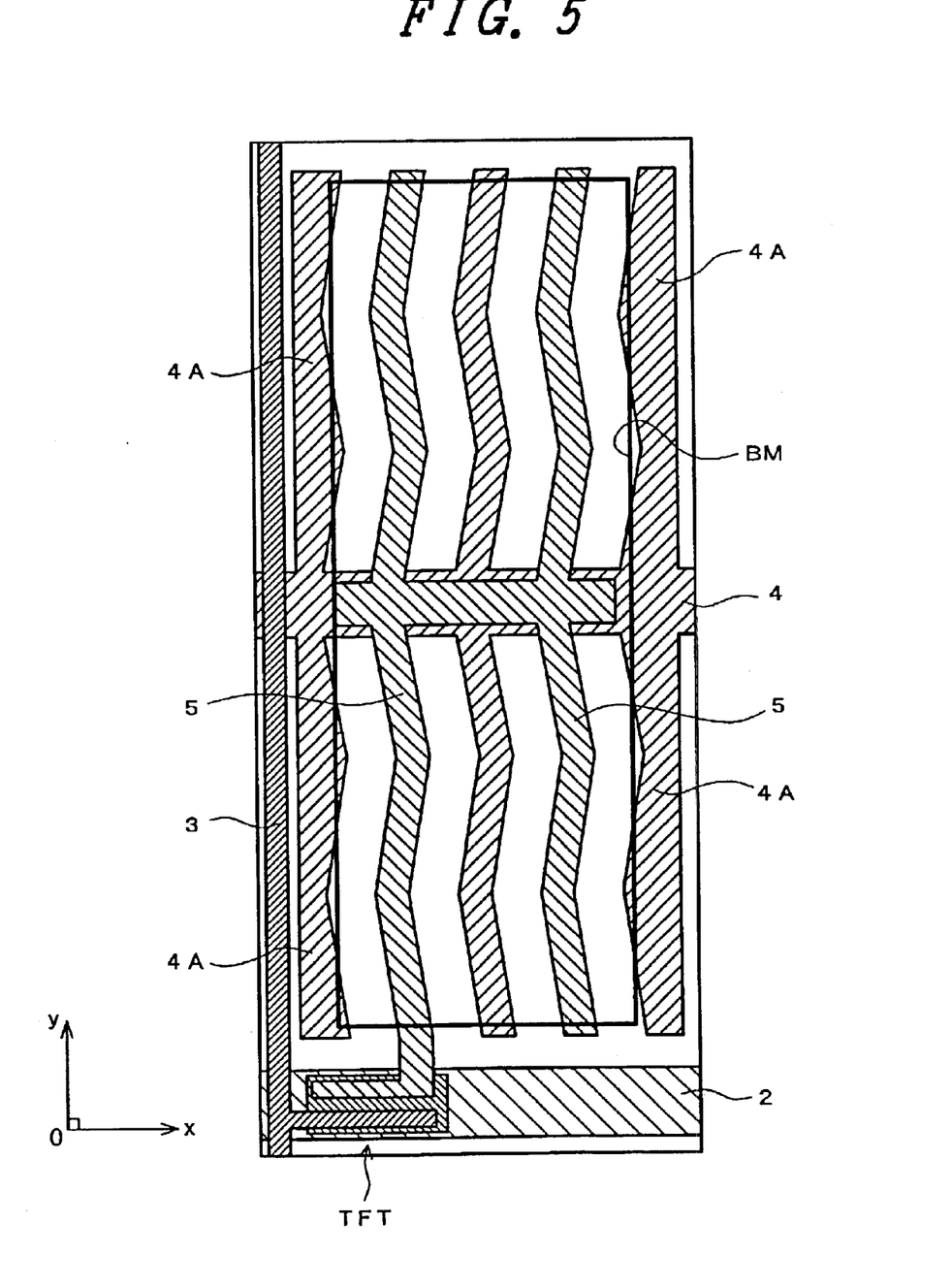
FIG. 5 is a plan view showing another embodiment of a pixel of a liquid crystal display device according to the present invention.

FIG. 5 is a plan view of another embodiment of the liquid crystal display device of the present invention and it corresponds to FIG. 1.

In FIG. 5, the constitution which differs from that of FIG. 1 is that the arrangement relationship of the black matrix BM at the filter substrate side relative to the counter electrode 4A which is disposed adjacent to the drain line 3 is explicitly determined.

That is, the counter electrodes 4A which are disposed adjacent to the drain lines 3 are respectively positioned within the pixel region at left and right sides in the drawing. By arranging the counter electrodes 4A at such positions, the electric fields generated by the video signals from the drain lines 3 are not terminated to pixel electrodes 5 but are easily terminated to the counter electrodes 4A so as to suppress the occurrence of noise.

Respective one counter electrode of a pair of these counter electrodes 4A (the counter electrode disposed at the central side of the pixel region is not taken as an object) is formed in a concave and convex pattern where one counter electrode meshes with the side of the other counter electrode 4A.

This concave and convex pattern is, as shown in the drawing, for example, made of a combination of straight lines which has deflection points at mountains and valleys thereof thus forming a so-called zigzag shape.

Considering the fact that a so-called multi-domain system where two kinds of direction of electric field exist in the electric field generated between the pixel electrode 5 and the counter electrode 4A in a unit pixel is adopted in this embodiment, the concave and convex patterns of the counter electrodes 4A are formed such that they correspond with the zigzag patterns of remaining other counter electrode 4A and the pixel electrode 5, that is, the widths of the respective electrodes becomes equal.

In this embodiment, with respect to respective counter electrodes 4A adjacent to the drain lines 3, the above-mentioned concave and convex patterns are not formed on the drain-line-3-side sides and such sides are formed in parallel with the drain lines 3.

The region defined between the drain line 3 and the counter electrode 4A adjacent to this drain line 3 is made as narrow as possible so as to facilitate the shielding of the light leakage caused by the electric field generated between them with a black matrix BM which will be explained later.

In the black matrix BM formed at the filter substrate side, the sides of the aperture (boundary) which have a parallel relationship with the drain lines 3 are positioned between the valleys and mountains of the concave and convex pattern of respective counter electrodes 4A adjacent to the drain lines 3.

In other words, the black matrix BM is formed such that it exposes the convex portions and shields the concave portions out of the convex and concave portions formed on the counter electrodes 4A adjacent to the drain line 3.

The ideal positional relationship between respective counter electrodes 4A and the black matrix BM is that the sides of the aperture portion of the black matrix BM are preferably positioned on the central axes of the concave and convex patterns of respective counter electrodes 4A.

In the liquid crystal display device having the above-mentioned constitution, a following advantage is obtained. That is, at the time of performing the alignment of the TFT substrate 1A and the filter substrate, as shown in FIG. 6, even when the minute misalignment occurs particularly in the direction perpendicular to the drain line 3 (extending direction of the gate line 3), the occurrence of large fluctuation of the aperture rate can be obviated.

In other words, the light transmitting region within the apertured portion of the black matrix BM can be maintained approximately constant. That is, the maximum amount of light which transmits the apertured portion of the black, matrix BM can be maintained approximately constant.

Figure 6:
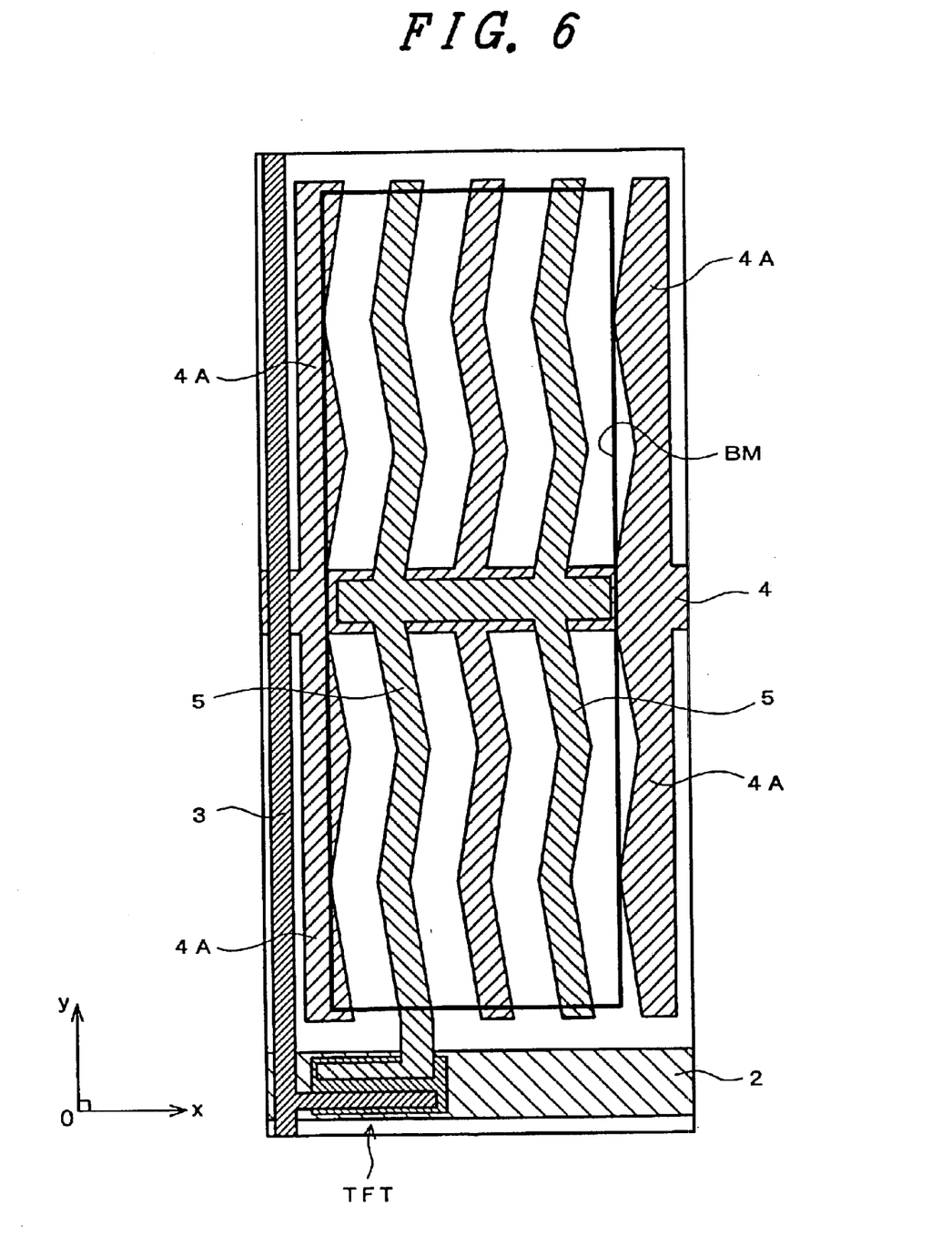
FIG. 6 is a plan view showing another embodiment of a pixel of a liquid crystal display device according to the present invention.

This owes to the establishment of the relationship that in case the misalignment of the filter substrate occurs relative to the TFT substrate 1A, as shown in FIG. 6, even if the convex portions at one counter electrode 4A side is exposed more from the apertured portion of the black matrix BM (aperture rate being decreased so long as these convex portions are considered), the convex portions of the other counter electrode 4A side is simultaneously shielded more from the apertured portion of the black matrix (aperture rate being increased so long as these convex portions are considered).

From the above, in the above-mentioned embodiment, the patterns of the counter electrodes 4A are not limited to those shown in the drawings and various kinds of patterns can be adopted so long as they meet a condition that they are provided with portions which are exposed from the black matrix and portions which are shielded by the black matrix at respective counter electrodes 4A.

For example, the concave and convex patterns may be formed in a shape similar to a sinusoidal wave or a pulse wave.

Embodiment 5

Figure 7:
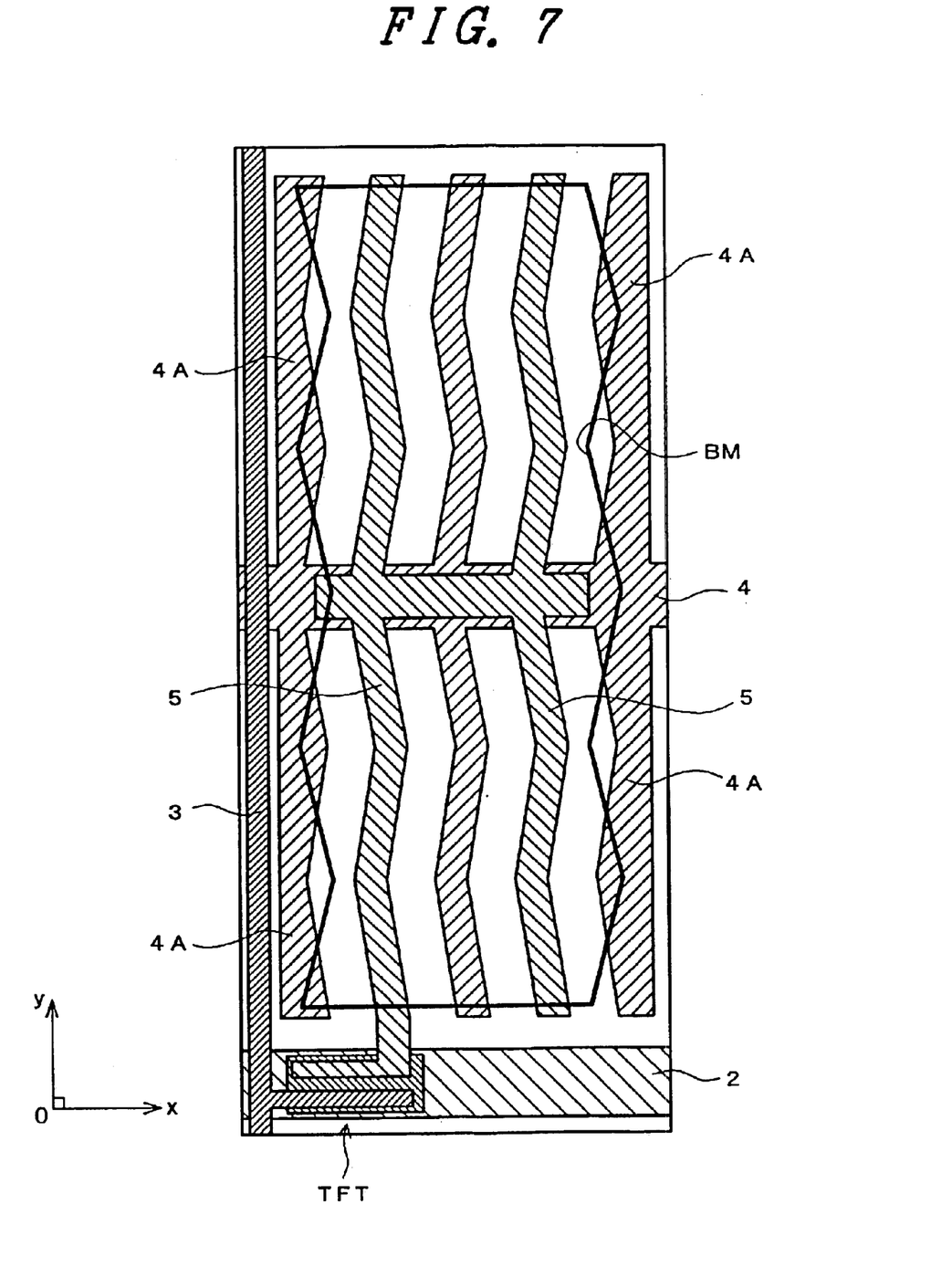
FIG. 7 is a plan view showing another embodiment of a pixel of a liquid crystal display device according to the present invention.

FIG. 7 is a plan view showing another embodiment of the liquid crystal display device of the present invention and it corresponds to FIG. 5.

The constitution that differs from the constitution of FIG. 5 is that concave and convex patterns are also formed on the sides of the aperture of the black matrix BM along the counter electrodes 4A adjacent to the drain lines 3.

In this case, the concave and convex patterns of the black matrix BM are formed such that a pair of sides on which concave and convex patterns are formed mesh with each other and as in the case of the counter electrodes 4A, they are made of a combination of segments having deflection points thus forming a zigzag shape.

In this black matrix BM, the convex portions of the counter electrodes 4A are exposed at the concave portions, while the concave portions of the counter electrodes 4A are shielded at the convex portions.

Also with such a constitution, in case the misalignment of the filter substrate relative to the TFT substrate 1A occurs, although the convex portions are exposed more from the apertured portion of the black matrix at one counter electrode 4A sides, the convex portions are simultaneously shielded more from the apertured portion of the black matrix at the other counter electrode 4A sides so that the substantial change of the aperture rate can be drastically decreased.

Embodiment 6

Figure 8:
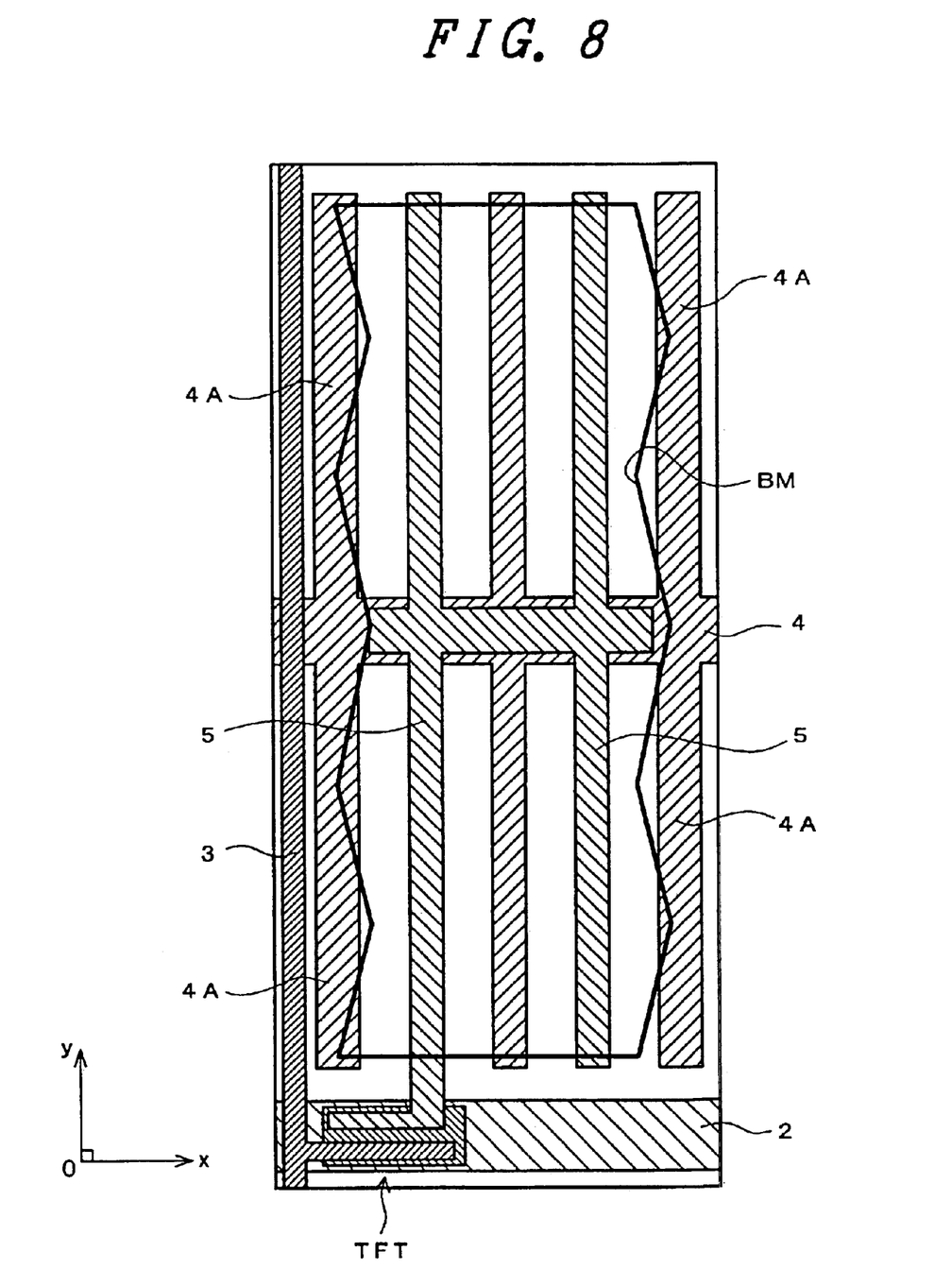
FIG. 8 is a plan view showing another embodiment of a pixel of a liquid crystal display device according to the present invention.

FIG. 8 is a plan view showing another embodiment of the liquid crystal display device of the present invention. The above-mentioned embodiments 4 and 5 both adopt the multi-domain system, this embodiment discloses the liquid crystal display device which does not adopt such a system.

That is, both of the pixel electrode 5 and the counter electrode 4A extend along one direction (y direction in the drawing) and the direction of the electric field generated between respective electrodes is set to a single direction (x direction in the drawing).

Accordingly, the counter electrodes 4A disposed adjacent to the drain lines 3 are both extended in the y direction as in the case of other electrodes and the sides thereof in the extending direction are made straight.

On the other hand, the filter-substrate-side black matrix BM is provided with concave and convex patterns such that the concave and convex patterns mesh with each other at respective sides of the aperture along the counter electrodes 4A adjacent to the drain lines 3.

These concave and convex patterns are made of a combination of segments having deflection points thus forming a zigzag shape.

Also with such a constitution, in case the misalignment of the filter substrate relative to the TFT substrate 1A occurs, although one counter electrode 4A is exposed more from the concave portions of the black matrix BM, the other counter electrode 4A is simultaneously shielded more by the convex portions of the black matrix BM.

Embodiment 7

Figure 9:
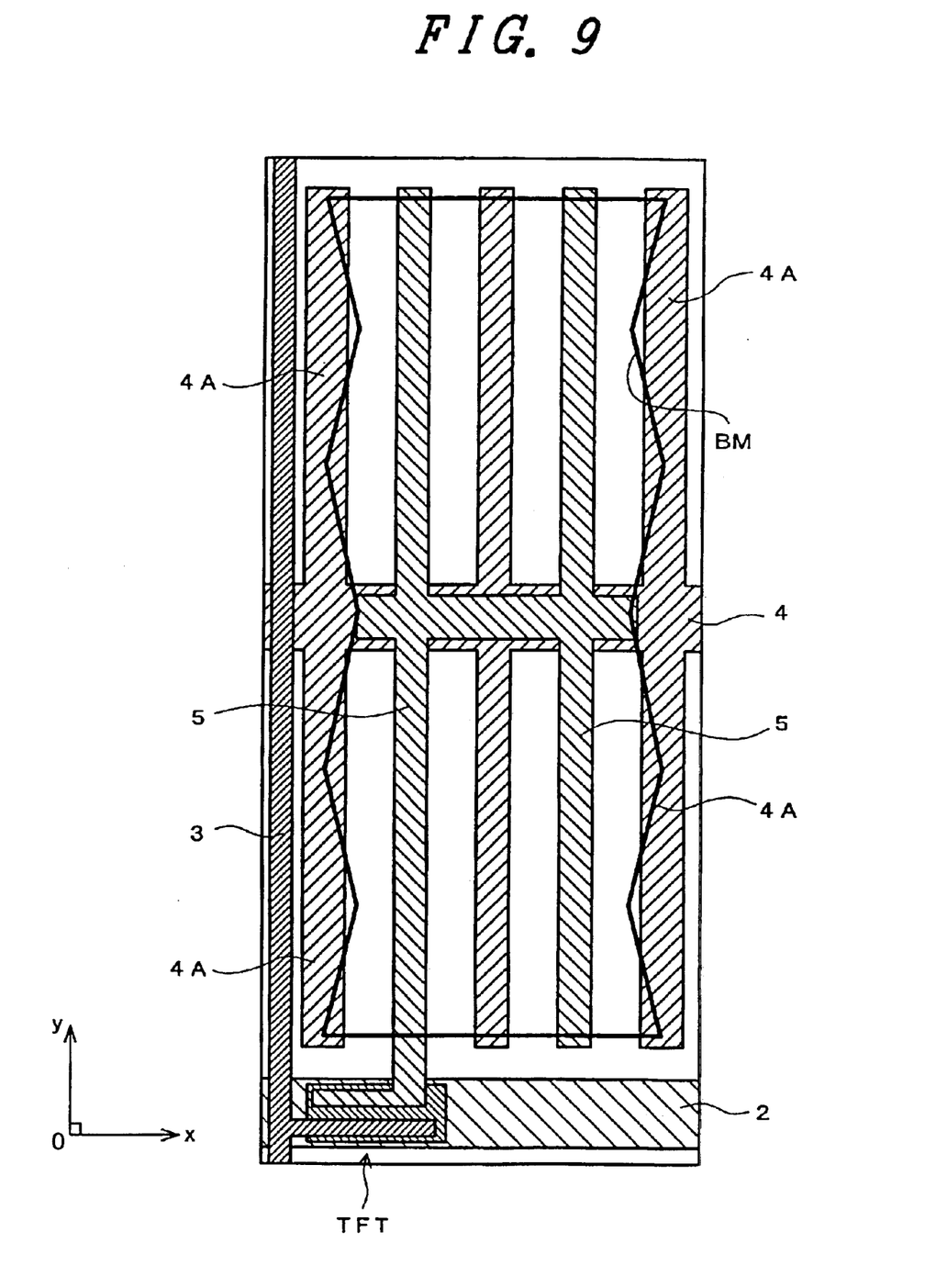
FIG. 9 is a plan view showing another embodiment of a pixel of a liquid crystal display device according to the present invention.

FIG. 9 is a plan view showing another embodiment of the liquid crystal display device of the present invention and it corresponds to FIG. 8.

The constitution which differs from that of FIG. 8 in comparison is that the filter-substrate-side black matrix BM is provided with concave and convex patterns with a relationship that they do not mesh with each other at respective sides of the aperture along the counter electrodes 4A adjacent to the drain lines 3.

That is, the relationship that the concave portions formed on one side of the aperture face the concave portions formed on the other side of the aperture at the corresponding positions in an opposed manner, or the concave portions formed on the other side of the aperture face the concave portions formed on one side of the aperture at the corresponding positions in an opposed manner is established.

Also with such a constitution, in case the misalignment of the filter substrate relative to the TFT substrate 1A occurs, although one counter electrode 4A is exposed more from the concave portions of the black matrix BM, the other counter electrode 4A is simultaneously shielded more by the convex portions of the black matrix BM.

In any one of the embodiments 4 to 7, the liquid crystal display device in which the black matrix is formed on the side of the transparent substrate opposite to the side of the transparent substrate on which the electrode is formed is explained.

It is needless to say, however, that the advantage is obtained by constituting the electrodes or the black matrix in the above patterns even in case the black matrix is formed partially or entirely on the side of the substrate on which the electrodes are formed.

In this case, the problems caused by the misalignment of the electrodes and the black matrix can be resolved.

Embodiment 8

Figure 10:
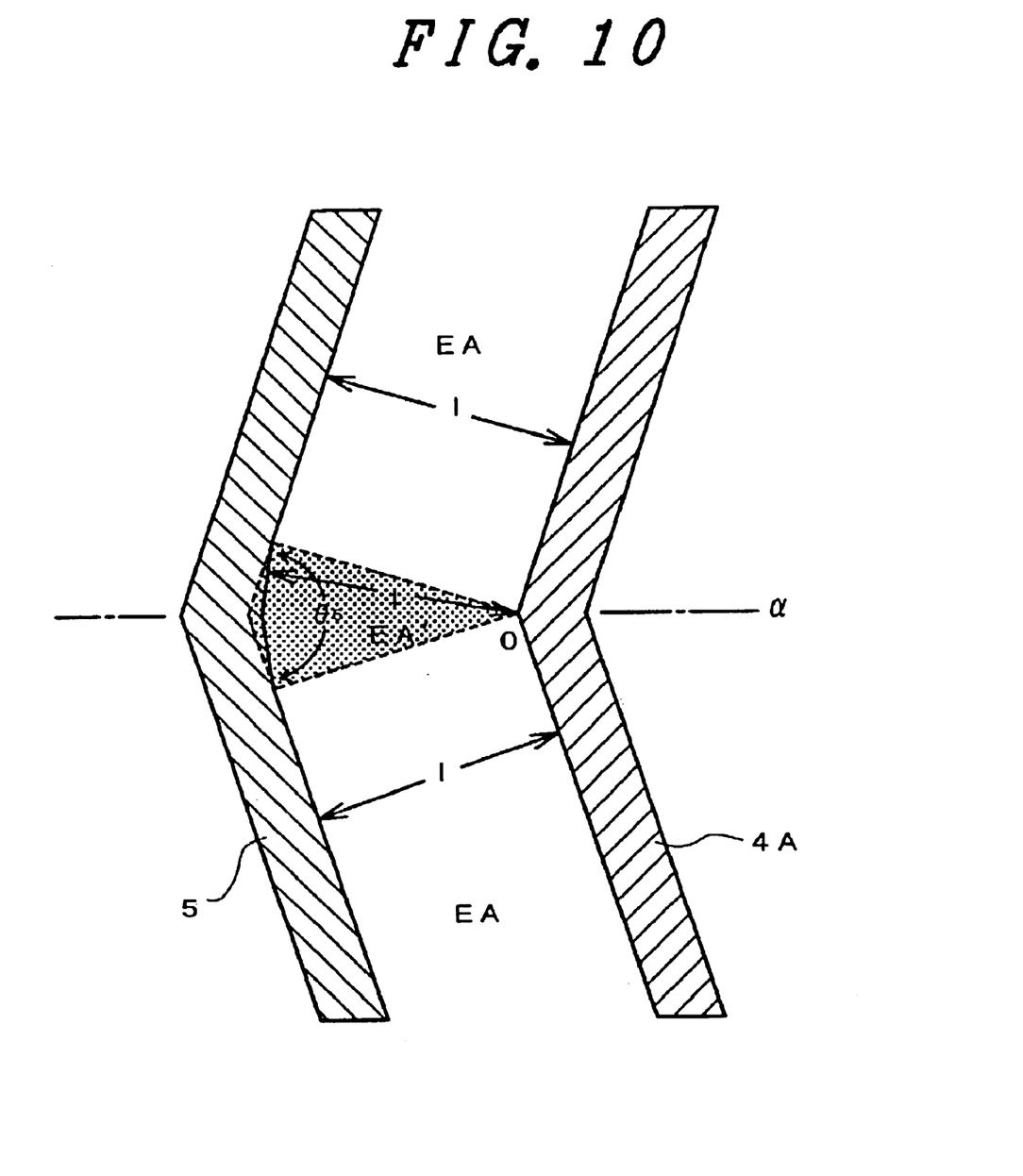
FIG. 10 is a plan view showing one embodiment of an electrode of a liquid crystal display device according to the present invention.

FIG. 10 is a plan view showing another embodiment of the liquid crystal display device of the present invention and is an enlarged view of a portion of a dotted circle A shown in FIG. 1.

That is, FIG. 10 shows the pixel electrode 5 which is formed with bent portions in the midst thereof along its extending direction and the counter electrode 4A which is formed at a position shifted in parallel from this pixel electrode 5.

The reason why the extending directions of the respective electrodes are made different using a line (phantom line α) shown in the drawing as a border is that, as mentioned above, a so-called multi-domain system which makes the direction of the electric field generated between the pixel electrode 5 and the counter electrode 4A different is adopted so as to resolve the inconvenience caused by the visual angle dependence of the liquid crystal display panel that when the visual point is inclined obliquely relative to the main visual angle direction of the liquid crystal display panel, the reverse phenomenon of the luminance is induced.

Further, in this embodiment, although the side of the pixel electrode 5 at the bent portion of the counter electrode 4A side has an opening angle $\theta_5$ of not less than 180°, this portion is formed in an arcuate shape having the center thereof at a deflection point O on the side of the counter electrode 4A of the pixel electrode 5 side at the bent portion of the counter electrode 4A.

Due to such a constitution, between the pixel electrode 5 and the counter electrode 4A, an electric field generating region EA which permits the light to pass therethrough can make its width (corresponding to the shortest distance 1 between electrodes in the direction of electric field) all equal along its longitudinal direction.

In other words, by providing the arcuate pattern at the bent portions of the pixel electrode 5, the field strength of the electric field generating region at the portions can be substantially made equal to the field strength of the electric field generating region at other portions.

Conventionally, the pixel electrode 5 is formed with a pattern shown by a dotted line in the drawing, the shortest distance between the electrodes at the bent portion is larger than that of other portions and hence, the field strength of the electric field generating region EA' shown by scattered points in the drawing was lower than the field strength of the electric field generating region EA of other portions.

Accordingly, in case the liquid crystal used; is a so-called normally white (white display in the condition that the electric field is not applied), even when the black display is required, a, phenomenon that the bent portions become bright so that the contrast is lowered arises.

Further, in case the liquid crystal is a so-called normally black (black display in the condition that the electric field is not applied), a phenomenon that even when the white display is required, these bent portions become dark so that a phenomenon that the light transmittance is lowered arises.

Although the arcuate patterns are formed on the bent portions of the pixel electrode 5 in the above-mentioned embodiment, in case the positions of the pixel electrode 5 and the counter electrode 4A are replaced such that the counter electrode 4A is positioned at the left side and the pixel electrode 5 is positioned at the right side in the drawing, it is needless to say that the arcuate pattern is formed on the bent portions of the counter electrode.

Embodiment 9

Figure 11:
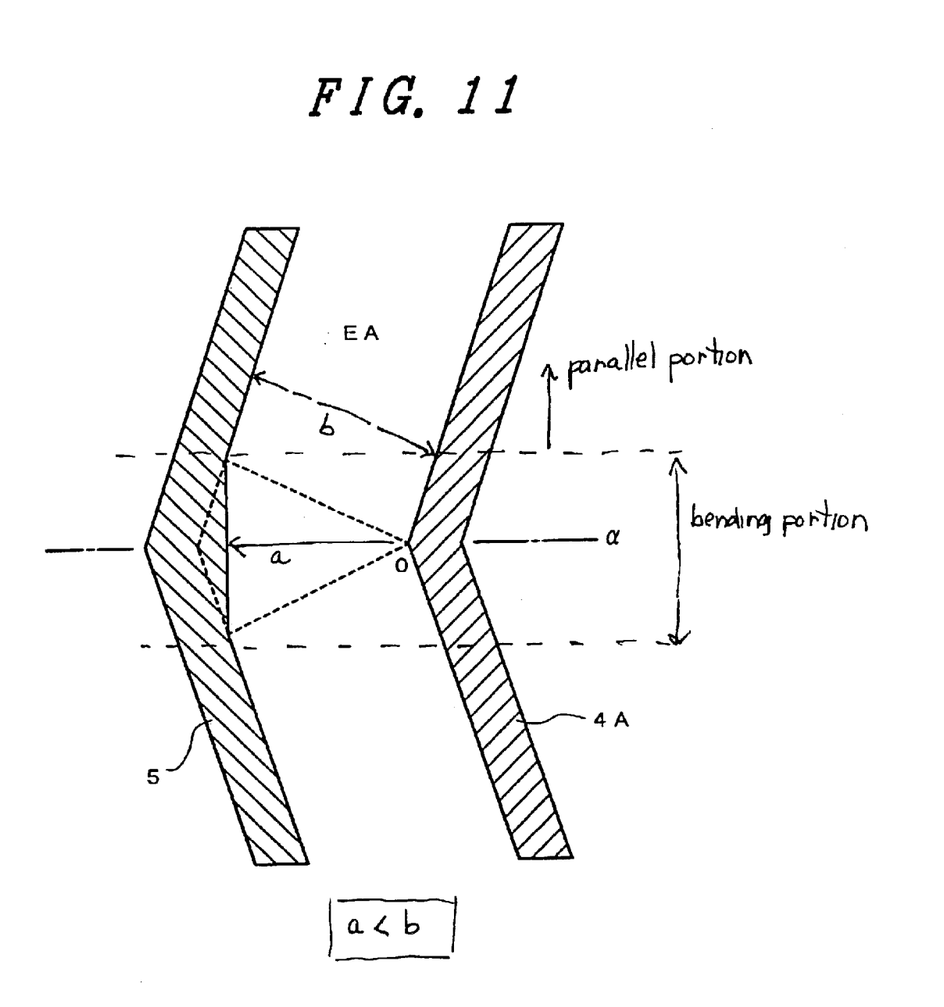
FIG. 11 is a plan view showing another embodiment of an electrode of a liquid crystal display device according to the present invention.

FIG. 11 is a plan view of another embodiment of the liquid crystal display device of the present invention and it corresponds to FIG. 10.

In the drawing, at the bent portions of the pixel electrode 5, the side of the pixel electrode 5 at the counter electrode 4A side is protruded toward the counter electrode 4A and the width between the electrodes at this portion is made small.

In this case, as in the case of the embodiment 9, the spaced-apart distance between the pixel electrode 5 and the counter electrode 4A at the bent portions does not become equal to the spaced-apart distance between the pixel electrode 5 and the counter electrode 4A at remaining other portions in a strict sense and hence, the field intensity of the electric field between the pixel electrode 5 and the counter electrode 4A at the bent portions is enhanced. The reason why the field intensity at the bent portions is made particularly stronger than the field intensity at other portions is that although the direction of the electric field differs in these bent portions so that the condition that liquid crystal cannot rotate smoothly compared to other portions arises, such condition can be resolved by increasing the field intensity at the bent portions in the above manner thus restricting the lowering of the contrast or the lowering of the light transmittance.

Embodiment 10

Figure 12:
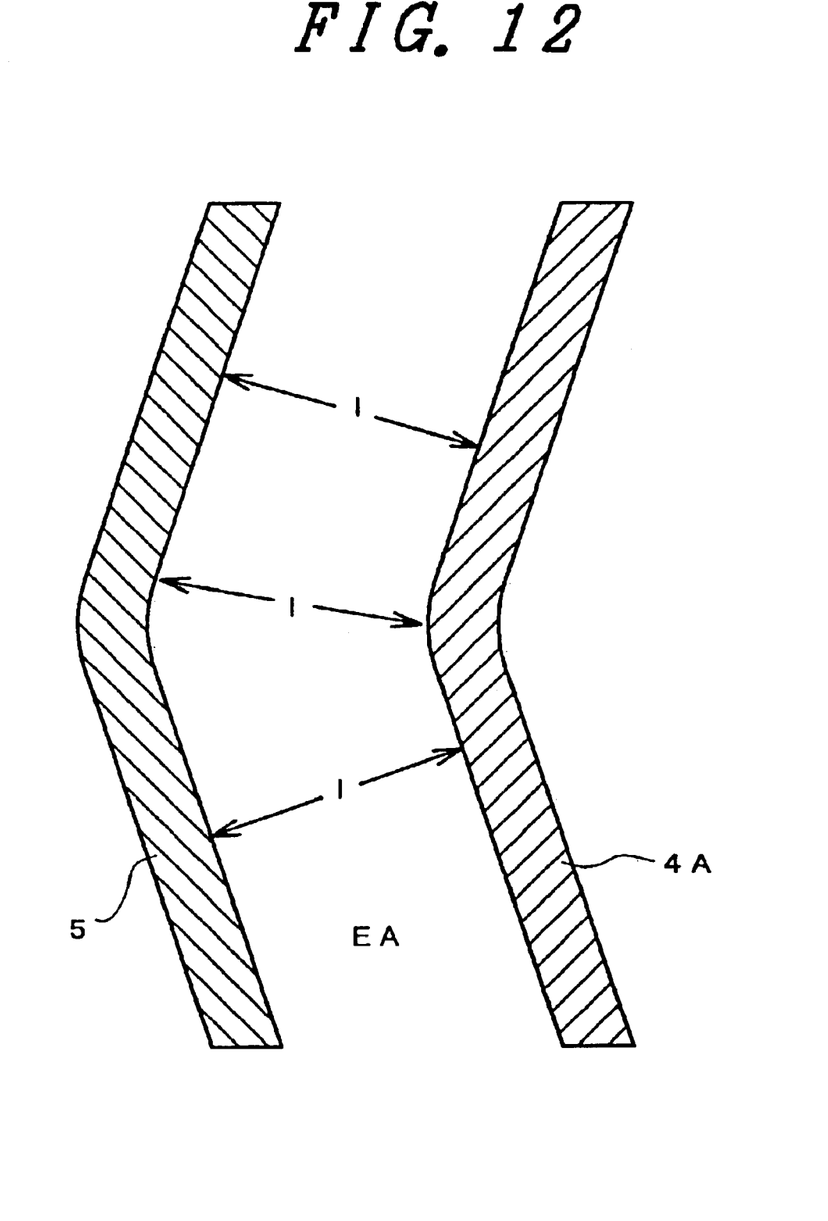
FIG. 12 is a plan view showing another embodiment of an electrode of a liquid crystal display device according to the present invention.

FIG. 12 is a plan view showing another embodiment of the liquid crystal display device of the present invention and it corresponds to FIG. 10.

In comparison with FIG. 10, as shown in FIG. 12, corner portions formed at the bent portions of the side of the counter electrode 4A at the pixel electrode 5 side are also formed into an arcuate shape.

That is, at the bent portions of respective electrodes, the sides of the respective electrodes which face the sides of the other electrodes in an opposed manner are formed such that they draw a smooth arcuate line.

In other words, in the electric field generating regions EA defined between the pixel electrode 5 and the counter electrode 4A, the extending directions are made different by curving the midst portions thereof and the width 1 is set uniform along the extending directions.

In this case, as in the case of FIG. 10, the field intensity of the electric field generated between the pixel electrode 5 and the counter electrode 4A can be made uniform in all field.

Further, since the respective electrodes have no corner portions at sides thereof which face the other electrodes in an opposed manner, the occurrence of the electricity field concentration at the corner portions can be obviated.

Experiment 11

Embodiments 8 to 10 respectively disclose the liquid crystal display device where the field intensity at the bent portions of a pair of electrodes is made substantially equal to the field intensity of portions other than the bent portions.

It is needless to say, however, that corner portions having an angle of not more than 180° formed at the bent portions of a pair of electrodes are formed in arcuate patterns without aiming at the above purpose.

This is because that due to such a constitution, the concentration of the electric field can be obviated.

As has been described heretofore, according to the liquid crystal display device of the present invention, irrespective of the misalignment of the substrates, the lowering of the aperture rate can be prevented.

What is claimed is:

1. A liquid crystal display device comprising:

a pair of opposing substrates, at lease one of said pair of opposing substrates being transparent;

a pair of electrodes formed on one of said pair of opposing substrates;

said pair of electrodes having bending and parallel portions where the electrodes are substantially in parallel;

wherein a first of said pair of electrodes is protruded toward a second of said pair of electrodes at the bending portions, and the second of said pair of electrodes is protruded toward the first of said pair of electrodes at the bending portions where the second of said pair of electrodes is elongated straight between the bending portions; and wherein said pair of electrodes are spaced at the bending portions and a width between the electrodes at the bending portions that elongated straight is smaller than the widths between the electrodes at the parallel portions.

2. A liquid crystal display device comprising:

a pair of opposing substrates, at least one of said pair of opposing substrates being transparent;

a pair of electrodes formed on one of said pair of opposing substrates;

said pair of electrodes having bending and parallel portions where the electrodes are substantially in parallel;

wherein field intensity formed between the electrodes is enhanced at the bending portions than at the parallel portions;

wherein a first of said pair of electrodes is protruded toward a second of said pair of electrodes at the bending portions, and the second of said pair of electrodes is protruded toward the first of said pair of electrodes at the bending portions where the second of said pair of electrodes is elongated straight between the bending portions.

3. A liquid crystal display device comprising:

a pair of opposing substrates, at least one of said pair of opposing substrates being transparent;

a pair of electrodes formed on one of said pair of opposing substrates;

said a pair of electrodes having bending and parallel portions where the electrodes are substantially in parallel;

wherein said pair of electrodes are spaced at the bending portions and at least one of said pair of electrodes has a protruded form between bending portions; and wherein a first of said pair of electrodes is protruded toward a second of said pair of electrodes at the bending portions, and the second of said pair of electrodes is protruded toward the first of said pair of electrodes at the bending portions where the second of said pair of electrodes is elongated straight between the bending portions.

4. A liquid crystal display device comprising:

a pair of opposing substrates, at least one of said pair of opposing substrates being transparent;

a pair of electrodes formed on one of said pair of opposing substrates;

said pair of electrodes having V-shaped portions;

wherein a first of said pair of electrodes is protruded toward a second of said pair of electrodes at the V-shaped portions, and the second of said pair of electrodes is protruded toward the first of said pair of electrodes at the V-shaped portions where the second of said pair of electrodes is elongated straight between the V-shaped portions; and wherein a width between the electrodes at the V-shaped portions that elongated straight is smaller than the widths between the electrodes at other portions where the electrodes are arranged substantially in parallel.

* * * * *